(12) United States Patent
Yu et al.

(10) Patent No.: US 11,441,876 B2
(45) Date of Patent: Sep. 13, 2022

(54) MULTILAYERED BULLET RESISTANT MEMBER, PREPARATION METHOD AND APPLICATION THEREOF

(71) Applicant: Jiangnan University, Wuxi (CN)

(72) Inventors: Kejing Yu, Wuxi (CN); Shen Li, Wuxi (CN); Kun Qian, Wuxi (CN); Diantang Zhang, Wuxi (CN); Yang Xu, Wuxi (CN); Qingsheng Liu, Wuxi (CN); Feng Xu, Wuxi (CN)

(73) Assignee: JIANGNAN UNIVERSITY, Wuxi (CN)

( * ) Notice: Subject to any disclaimer, the term of this patent is extended or adjusted under 35 U.S.C. 154(b) by 412 days.

(21) Appl. No.: 16/689,112

(22) Filed: Nov. 20, 2019

(65) Prior Publication Data

US 2020/0116457 A1  Apr. 16, 2020

Related U.S. Application Data

(63) Continuation-in-part of application No. PCT/CN2019/071582, filed on Jan. 14, 2019.

(30) Foreign Application Priority Data

Nov. 28, 2018 (CN) .......................... 201811432954.4

(51) Int. Cl.
*F41H 5/04* (2006.01)
*B32B 5/02* (2006.01)
(Continued)

(52) U.S. Cl.
CPC ............ *F41H 5/0492* (2013.01); *B32B 5/024* (2013.01); *B32B 5/18* (2013.01); *B32B 5/245* (2013.01); *B32B 5/26* (2013.01); *B32B 9/005* (2013.01); *B32B 9/046* (2013.01); *B32B 9/047* (2013.01); *B32B 37/02* (2013.01);
(Continued)

(58) Field of Classification Search
CPC ...... F41H 5/0428; F41H 5/0442; F41H 5/023; F41H 5/0457; F41H 5/0421; F41H 5/0478; F41H 5/0492; F41H 5/0414; B32B 15/14; B32B 2250/03; B32B 2260/046; B32B 2307/56; B32B 2305/188; B32B 2305/022; B32B 2571/02; B32B 2311/00; B32B 2311/24; B32B 2315/02; B32B 9/046; B32B 9/005; B32B 9/047; B32B 5/024;
(Continued)

(56) References Cited

U.S. PATENT DOCUMENTS

2008/0139071 A1 * 6/2008 Bhatnagar ............. F41H 5/0478
442/164

FOREIGN PATENT DOCUMENTS

| CN | 101158564 A | 4/2008 |
| CN | 104949581 A | 9/2015 |

(Continued)

*Primary Examiner* — Camie S Thompson
(74) *Attorney, Agent, or Firm* — Bayramoglu Law Offices LLC

(57) ABSTRACT

A multilayered bullet resistant member, including a three-layered structure formed of a metal-ceramic crack arrest reflecting layer, a fiber-elastomer composite energy absorbing layer and a two-dimensional fabric blunt trauma protective layer sequentially overlapped with each other. The integration of performances of all the components guarantees high strength, hardness and good impact toughness of the bullet resistant member.

15 Claims, 1 Drawing Sheet

(51) Int. Cl.

| | |
|---|---|
| *B32B 5/26* | (2006.01) |
| *B32B 5/24* | (2006.01) |
| *B32B 5/18* | (2006.01) |
| *B32B 9/00* | (2006.01) |
| *B32B 9/04* | (2006.01) |
| *B32B 37/02* | (2006.01) |
| *B32B 37/10* | (2006.01) |
| *B32B 37/18* | (2006.01) |
| *B32B 37/14* | (2006.01) |

(52) U.S. Cl.
CPC ........ *B32B 37/1018* (2013.01); *B32B 37/144* (2013.01); *B32B 37/182* (2013.01); *B32B 2255/205* (2013.01); *B32B 2260/023* (2013.01); *B32B 2260/046* (2013.01); *B32B 2262/0253* (2013.01); *B32B 2262/0269* (2013.01); *B32B 2266/0278* (2013.01); *B32B 2305/022* (2013.01); *B32B 2305/076* (2013.01); *B32B 2305/188* (2013.01); *B32B 2307/558* (2013.01); *B32B 2307/56* (2013.01); *B32B 2307/581* (2013.01); *B32B 2307/5825* (2013.01); *B32B 2309/02* (2013.01); *B32B 2309/04* (2013.01); *B32B 2309/12* (2013.01); *B32B 2311/24* (2013.01); *B32B 2315/02* (2013.01); *B32B 2323/043* (2013.01); *B32B 2363/00* (2013.01); *B32B 2377/00* (2013.01); *B32B 2571/02* (2013.01)

(58) Field of Classification Search
CPC ... B32B 5/18; B32B 5/245; B32B 2266/0278; B32B 2266/06; B32B 2266/08
USPC ..... 89/910, 914, 904, 22, 17, 907, 906, 909; 501/127; 442/1, 60, 59; 2/2.5
See application file for complete search history.

(56) References Cited

FOREIGN PATENT DOCUMENTS

| | | |
|---|---|---|
| CN | 105333772 A | 2/2016 |
| CN | 105444622 A | 3/2016 |
| CN | 106631028 A | 5/2017 |
| CN | 108395251 A | 8/2018 |
| WO | 2014069268 A1 | 5/2014 |
| WO | 2018210900 A1 | 11/2018 |

\* cited by examiner

MULTILAYERED BULLET RESISTANT MEMBER, PREPARATION METHOD AND APPLICATION THEREOF

CROSS REFERENCE TO THE RELATED APPLICATIONS

This application is the continuation-in-part application of International Application No. PCT/CN2019/071582, filed on Jan. 14, 2019, which is based upon and claims priority to Chinese Patent Application No. 2018114329544, filed on Nov. 28, 2018, the entire contents of which are incorporated herein by reference.

TECHNICAL FIELD

The present disclosure relates to the technical field of bullet, mechanical damage resistant composites, and in particular, to a multilayered bullet resistant member, a preparation method and an application thereof.

BACKGROUND

With the rapid development of global economy and worldwide military technology, the demands for protective performances of bullet resistant materials against ballistic impact have been increasing. Compared to a conventional homogenous armor, a conventional protective armor has certain protective performance, however, disadvantages of being large in mass, high in thickness, weak in design, low in performance, inconvenient in fitting, carrying and management still exist. Since individual combat protective effect is more concerned in modern bullet resistant materials, the research and development (R&D) of mechanical damage resistant materials in today's society is developing towards a light, comfortable, low-cost, multi-functional, high-performance trend, the improvement of conventional materials and R&D of new materials are taken into account, the combination of new high-performance materials and conventional research ideas can exhibit more comprehensive performance of different materials through advantages complementary.

Chinese patent publication CN108395251A discloses a monolithic silicon carbide wood ceramic bullet resistant panel and a preparation method and an application thereof, which takes the silicon carbide wood ceramic prepared by composite molding of carbon fibers, hollow ceramic microspheres and phenolic resin as a panel, bonds and compounds the ultrahigh molecular weight polyethylene fibers as the bullet resistant back panel, and is featured by multi-layered and lightweight. However, the bullet penetration depth and the back convex height of the material are large, ceramics are fragile and suffered irreversible damages after being shot, and therefore, adopting a crack arrest energy absorbing material has a certain reference significance in optimizing ceramic-fiber composite bullet resistant plate.

SUMMARY

In view of the above problems in the prior art, the applicant provides a multilayered bullet resistant member and a preparation method and an application thereof. The integration of performances of all the components guarantees high strength, hardness and good impact toughness of the bullet resistant member.

The technical solutions of the present disclosure are as follows:

According to a first aspect of the present disclosure, there is provided a multilayered bullet resistant member, including a three-layered structure formed of a metal-ceramic crack arrest reflecting layer, a fiber-elastomer composite energy absorbing layer and a two-dimensional fabric blunt trauma protective layer sequentially overlapped with each other.

The metal in the metal-ceramic crack arrest reflecting layer is an aluminum alloy; the ceramic is selected from one or more of silicon carbide, boron carbide, boron nitride and aluminum oxide; and the thickness of the metal-ceramic crack arrest reflecting layer is 7 mm to 9 mm.

The aluminum alloy is selected from one or more of 2024 series Al—Cu—Mg, 7000 series Al—Zn, 5000 series Al—Mg and 2000 series Al—Cu.

The fiber-elastomer composite energy absorbing layer is prepared by compounding a high-performance fiber impregnated matrix resin and an elastomer material, the matrix resin accounts for 25-35 wt % of the fiber-elastomer composite energy absorbing layer, the elastomer material accounts for 15-20 wt %; and the thickness of the fiber-elastomer composite energy absorbing layer is 3.5 mm to 4.5 mm.

The high-performance fiber is selected from one of aramid fibers, ultrahigh molecular weight polyethylene fibers, carbon fibers, poly (p-phenylene-benzobisoxazole) (PBO) fiber filaments or staple fibers; the matrix resin is selected from one of thermosetting epoxy resin, phenol-formaldehyde resin and organic silicone resin; the elastomer material is selected from one of shear thickening fluid and polyurethane foam; and the woven form of the high-performance fiber filaments is selected from one of plain, twill and satin.

The two-dimensional fabric blunt trauma protective layer is prepared by compounding a continuous length high-performance fiber impregnated matrix resin; the high-performance fiber is arranged in a length direction of impregnated fabric; the thickness of the two-dimensional fabric blunt trauma protective layer is 10 mm to 12 mm.

The high-performance fiber is arranged in layers by one or more of aramid fibers, ultrahigh molecular weight polyethylene fibers and PBO fibers.

The matrix resin is selected from any one of thermosetting epoxy resin, phenol-formaldehyde resin, organic silicone resin and vinyl ester resin; and the content of the matrix resin accounts for 15-25 wt % of the two-dimensional fabric blunt trauma protective layer.

According to a second aspect of the present disclosure, there is provided a method of preparing a multilayered bullet resistant member, including the steps of:

1) preparing a metal-ceramic crack arrest reflecting layer: compounding the surface pretreated ceramic material preform by adopting a ceramic preform metal solution infiltration method, wherein a content ratio of metal to ceramic is 1:1, the preform has a preheating temperature of 300° C.-500° C., a casting temperature of 700° C.-900° C., and a permeation pressure of 2 MPa-5 MPa;

2) preparing a fiber-elastomer composite energy absorbing layer: combining a high-performance fiber and an elastomer material by adopting an impregnation drying method or a foaming curing process, so as to obtain a fiber-elastomer composite material, and compounding the fiber-elastomer composite material with a matrix resin by adopting a vacuum assisted forming process, wherein the curing temperature is 80° C.-150° C.;

3) preparing a two-dimensional fabric blunt trauma protective layer: respectively impregnating one or more high-performance fiber bundles and a high-performance plain woven fabric in the matrix resin, uniformly spreading by using a compression roller, wherein the high-performance fiber bundle is used for preparing a single UD sheet, and the content of the matrix resin is controlled to be 15-20 wt %; laying 20 layers of single UD sheets in cross-ply at a preset mixing ratio by 0°/90°, laying 4 to 6 layers of the high-performance plain woven fabrics, and bonding the two together with a compounding machine and a flat plate thermocompressor, and pressing under 10 MPa-20 MPa for 4 h to 5 h at a curing temperature of 80° C. to 150° C.; and 4) bonding and compounding the prepared metal-ceramic crack arrest reflecting layer, fiber-elastomer composite energy absorbing layer and two-dimensional fabric blunt trauma protective layer, so as to prepare the multilayered bullet resistant member.

According to a third aspect of the present disclosure, there is provided an application of a multilayered bullet resistant member in preparing a bullet resistant body armor, a bullet resistant wall or a bullet resistant shield.

The technical effects of the present disclosure lie in that: the present disclosure provides a multilayered bullet resistant member, overlapped and compounded by a metal-ceramic crack arrest reflecting layer, a fiber-elastomer composite energy absorbing layer and a two-dimensional fabric blunt trauma protective layer; the metal in the metal-ceramic crack arrest reflecting layer is compounded with the ceramic by casting, good plasticity and toughness provided by the metal can absorb bullet head energy, the crack arresting layer can buffer ceramic brittle deformation, rigid support during impact is provided by the ceramic, and the bullet head is passivated, eroded and destroyed; the high-performance fiber impregnated polymer matrix resin in the fiber-elastomer composite energy absorbing layer is prepared by compounding, the high-performance fiber provides toughness and high strength while the polymer matrix provides cohesiveness and energy absorption and diffusion are conducted under strong impact conditions; the high-performance fiber fabric in the two-dimensional fabric blunt trauma protective layer is impregnated and compounded with thermosetting resin, the high-performance fiber UD is arranged to provide the stress dispersion capability as a whole, and the high-performance plain woven fabric provides stress resistance against deformation as a whole.

In the preparing process, each part of the material composite adopts a conventional process, so that operation is convenient, and large-scale production is facilitated; the prepared multilayered bullet resistant member has the capability of absorbing and dispersing high impact energy, avoiding damage on human body, reducing the damage to the armor structure, the three-part structure functions cooperatively, providing an application effect of 1+1>2 and a reference significance for the preparing of military protection products.

DETAILED DESCRIPTION

Figure 1:
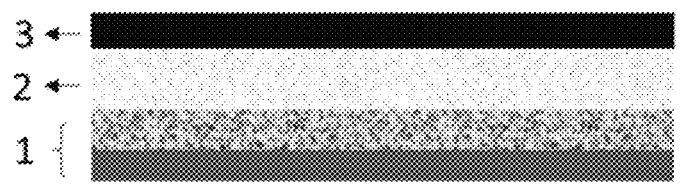
FIG. 1 is a schematic diagram of the present disclosure, in which, 1. metal-ceramic crack arrest reflecting layer; 2. fiber-elastomer composite energy absorbing layer; 3. two-dimensional fabric blunt trauma protective layer.
Figure 2:
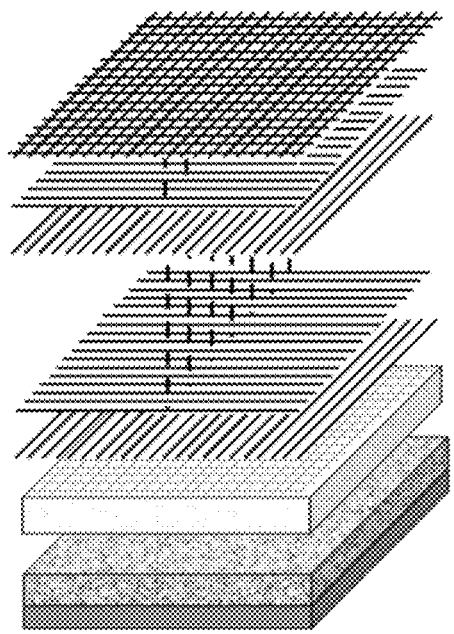
FIG. 2 is a schematic structural diagram of a material according to embodiment 1 of the present disclosure.
Figure 3:
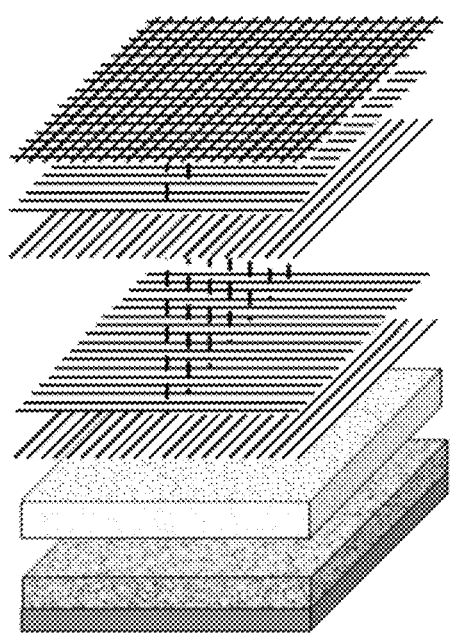
FIG. 3 is a schematic structural diagram of a material according to embodiment 3 of the present disclosure.

Hereinafter, embodiments of the present disclosure will be described in detail with reference to the accompanying drawings.

Embodiment 1

There is provided a multilayered bullet resistant member, including a three-layered structure formed of a metal-ceramic crack arrest reflecting layer, a fiber-elastomer composite energy absorbing layer and a two-dimensional fabric blunt trauma protective layer sequentially overlapped with each other; a method of preparing the multilayered bullet resistant member including the steps of:

1) preparation of the metal-ceramic crack arrest reflecting layer;

the metal-ceramic crack arrest reflecting layer is prepared by a 2024 series aluminum alloy and a boron carbide ceramic material with a particle size of 30 μm by adopting a ceramic preform metal solution infiltration method, where a content ratio of metal to ceramic is 1:1, the preform has a preheating temperature of 300° C., a casting temperature of 800° C., and a permeation pressure of 3.5 Mpa, and the prepared layer of composite material has a density of 2.8 g/cm$^3$ and a thickness of 9 mm;

2) preparation of a fiber-elastomer composite energy absorbing layer;

first, Kevlar 129 aramid filament and silica dispersion shear thickening fluid are compounded by adopting an impregnation drying method, where the aramid fibers are woven with 200 g/cm$^3$ plain woven cloth in a 1000D specification, the silica dispersion shear thickening liquid is prepared by dispersing 2.6 μm silica in ethylene glycol (vol % is 56%);

next, a fiber-elastomer composite material and epoxy resin are compounded by adopting a vacuum assisted forming process, the curing temperature is 80° C., and the prepared layer of composite material has a thickness of 4 mm;

3) preparation of a two-dimensional fabric blunt trauma protective layer;

first, Kevlar 129 aramid filament, ultrahigh molecular weight polyethylene and 170 g/cm$^3$ aramid fiber plain woven cloth are respectively impregnated in the epoxy resin, where the Kevlar 129 aramid filament and the ultrahigh molecular weight polyethylene are uniformly spread by using a compression roller to obtain a single UD sheet, and the content of the matrix resin is controlled to be 15 wt %;

next, 20 layers of single UD sheets are laid in cross-ply at a preset mixing ratio by 0°/90°, 5 layers of aramid fiber plain woven cloth are laid, the two are bonded together with a compounding machine and a flat plate thermocompressor, and pressed under 15 MPa for 4 h at a curing temperature of 80° C., and the prepared layer of composite material has a thickness of 11 mm;

4) three layers of composite materials are overlaid and bonded in a sequence of a metal-ceramic crack arrest reflecting layer—a fiber-elastomer composite energy absorbing layer—a two-dimensional fabric blunt trauma protective layer from outside to inside, to obtain a multilayered bullet resistant member.

Embodiment 2

There is provided a multilayered bullet resistant member, including a three-layered structure formed of a metal-ceramic crack arrest reflecting layer, a fiber-elastomer composite energy absorbing layer and a two-dimensional fabric blunt trauma protective layer sequentially overlapped with each other; a method of preparing the multilayered bullet resistant member including the steps of:

1) preparation of the metal-ceramic crack arrest reflecting layer;

the metal-ceramic crack arrest reflecting layer is prepared by a 7000 series aluminum alloy and a silicon carbide ceramic material with a particle size of 25 μm by adopting a ceramic preform metal solution infiltration method, where a content ratio of metal to ceramic is 1:1, the preform has a preheating temperature of 500° C., a casting temperature of 900° C., and a permeation pressure of 2 Mpa, and the prepared composite material has a density of 3.0 g/cm$^3$ and a thickness of 7 mm;

2) preparation of a fiber-elastomer composite energy absorbing layer;

first, JF-31 ultrahigh molecular weight polyethylene and silica dispersion shear thickening fluid are compounded by adopting an impregnation drying method, where the ultrahigh molecular weight polyethylene is woven with 200 g/cm$^3$ plain woven cloth in a 800D specification, the silica dispersion shear thickening liquid is prepared by dispersing 2.6 μm silica in ethylene glycol (vol % is 56%);

next, a fiber-elastomer composite material and phenol-formaldehyde resin are compounded by adopting a vacuum assisted forming process, the curing temperature is 150° C., and the prepared layer of composite material has a thickness of 3.8 mm;

3) preparation of a two-dimensional fabric blunt trauma protective layer;

first, Kevlar 129 aramid filament, ultrahigh molecular weight polyethylene and 170 g/cm$^3$ aramid fiber plain woven cloth are respectively impregnated in the organic silicone resin, where the Kevlar 129 aramid filament and the ultrahigh molecular weight polyethylene are uniformly spread by using a compression roller to obtain a single UD sheet, and the content of the matrix resin is controlled to be 20 wt %;

next, 20 layers of single UD sheets are laid in cross-ply at a preset mixing ratio by 0°/90°, 6 layers of aramid fiber plain woven cloth are laid, the two are bonded together with a compounding machine and a flat plate thermocompressor, and pressed under 10 MPa for 5 h at a curing temperature of 130° C., and the prepared layer of composite material has a thickness of 12 mm;

4) three layers of composite materials are overlaid and bonded in a sequence of a metal-ceramic crack arrest reflecting layer—a fiber-elastomer composite energy absorbing layer—a two-dimensional fabric blunt trauma protective layer from outside to inside, to obtain a multilayered bullet resistant member.

Embodiment 3

There is provided a multilayered bullet resistant member, including a three-layered structure formed of a metal-ceramic crack arrest reflecting layer, a fiber-elastomer composite energy absorbing layer and a two-dimensional fabric blunt trauma protective layer sequentially overlapped with each other; a method of preparing the multilayered bullet resistant member including the steps of:

1) preparation of the metal-ceramic crack arrest reflecting layer;

the metal-ceramic crack arrest reflecting layer is prepared by a 5000 series aluminum alloy and a boron nitride ceramic material with a particle size of 10 μm by adopting a ceramic preform metal solution infiltration method, where a content ratio of metal to ceramic is 1:1, the preform has a preheating temperature of 400° C., a casting temperature of 700° C., and a permeation pressure of 5 Mpa, and the prepared composite material has a density of 3.0 g/cm$^3$ and a thickness of 8 mm;

2) preparation of a fiber-elastomer composite energy absorbing layer;

first, aramid staple fiber and polyurethane foam are compounded by adopting a foaming curing process; where 4% aramid staple fiber (0.5 mm long), polyether polyol 4110 (42%), polymeric MDI (43%), catalyst stannous octoate (1%), foaming agent dichlorofluoroethane (10%) polyurethane foam raw materials are blended in a mold, foamed and cured in a 60° C. electric blast drying oven for 30 min, to obtain aramid staple fiber-polyurethane foam composite material after cooling down and removal from the mold;

next, the aramid staple fiber-polyurethane foam composite material and organic silicone resin are compounded by adopting a vacuum assisted forming process, the curing temperature is 130° C., and the prepared layer of composite material has a thickness of 4.5 mm;

3) preparation of a two-dimensional fabric blunt trauma protective layer;

first, PBO fiber, ultrahigh molecular weight polyethylene and 170 g/cm$^3$ aramid fiber plain woven cloth are respectively impregnated in the phenol-formaldehyde resin, where the PBO fiber and the ultrahigh molecular weight polyethylene are uniformly spread by using a compression roller to obtain a single UD sheet, and the content of the matrix resin is controlled to be 17.5 wt %;

next, 20 layers of single UD sheets are laid in cross-ply at a preset mixing ratio by 0°/90°, 4 layers of aramid fiber plain woven cloth are laid, the two are bonded together with a compounding machine and a flat plate thermocompressor, and pressed under 20 MPa for 4.5 h at a curing temperature of 150° C., and the prepared layer of composite material has a thickness of 10 mm;

4) three layers of composite materials are overlaid and bonded in a sequence of a metal-ceramic crack arrest reflecting layer—a fiber-elastomer composite energy absorbing layer—a two-dimensional fabric blunt trauma protective layer from outside to inside, to obtain a multilayered bullet resistant member.

Comparative Example 1

A bullet resistant member is prepared by overlaying and compounding aluminum alloy boron carbide ceramic plate with the same thickness as in embodiment 1 and aramid UD cloth, the average mass of the prepared bullet resistant member is about 30% heavier than that in embodiment 1.

Test Example

The one-piece multilayered bullet resistant members of 300 mm in length×250 mm in width×24 mm in height prepared in the comparative example and embodiment 1 are subjected to a target shooting test in accordance with GA141-2010 and GJB4300-2002, 3 shots for each target plate, and test results are shown in Table 1, neither of the one-piece multilayered bullet resistant members prepared in embodiment 1 and the comparative example is broken down.

TABLE 1

| Standard source | bullet resistant grade | Firearm type | Bullet type | Bullet initial velocity (m/s) | Average bullet penetration depth/mm | | Average back convex height/mm | |
|---|---|---|---|---|---|---|---|---|
| | | | | | Embodiment 1 | Comparative Example 1 | Embodiment 1 | Comparative Example 1 |
| GJB4300-2002 | GJB-V | Type 56 7.62 mm submachine gun | Type 56 7.62 mm ordinary bullet | 710 | 12.4 | 13.3 | 9.8 | 12.5 |
| GA141-2010 | GA-6 | Type 56 semi-automatic rifle | Type 56 7.62 mm ordinary bullet | 730 | 13.7 | 15.8 | 11.3 | 14.4 |
| | Special grade | Type 56 sniper rifle | Type 53 7.62 mm ordinary bullet | 820 | 19.7 | 21.2 | 17.6 | 22.8 |

It can be seen from Table 1 that, under the same test conditions, relative to comparative example 1, embodiment 1 has smaller average bullet penetration depth and average back convex height, and thus better bullet impact resistant reperformance. It proves that the product of the present disclosure is lighter in weight, stable in performance on the premise that the bullet resistant performance is improved.

Bullets with the same incident energy respectively penetrate each layer of material and the multilayered bullet resistant member of the present disclosure, the metal-ceramic crack arrest reflecting layer has a single bullet resistant capability close to and a deeper recessed damage than the composite bullet resistant member of the present disclosure. When a fiber-elastomer composite energy absorbing layer and a two-dimensional fiber protection supporting layer independently block high-speed impact of the bullet, and the bullet penetrates thoroughly. The ballistic impact residual kinetic energy (Er) of the composite bullet resistant member is larger than the individual testing result of each layer, in the process of penetrating the composite member, more energy of the bullet is dissipated, less deformation occurs in the process of penetration and compounding the bullet resistant member, and therefore, the prepared bullet resistant composite member of the present disclosure has a good impact-resistant effect.

Those described above are just preferred embodiments of the present disclosure, it should be noted that, various improvements and modifications can be made by those of ordinary skill in the art without departing from principles of the present disclosure and shall be within the scope of the present disclosure.

What is claimed is:

1. A multilayered bullet resistant member, comprising a three-layered structure formed of a metal-ceramic crack arrest reflecting layer, a fiber-elastomer composite energy absorbing layer and a two-dimensional fabric blunt trauma protective layer sequentially overlapped with each other,
   wherein a metal in the metal-ceramic crack arrest reflecting layer is an aluminum alloy; a ceramic is at least one selected from the group consisting of silicon carbide, boron carbide, boron nitride and aluminum oxide; and a thickness of the metal-ceramic crack arrest reflecting layer is 7 mm to 9 mm.

2. The multilayered bullet resistant member of claim 1, wherein the aluminum alloy is at least one selected from the group consisting of 2024 series Al—Cu—Mg, 7000 series Al—Zn, 5000 series Al—Mg and 2000 series Al—Cu.

3. The multilayered bullet resistant member of claim 1, wherein the fiber-elastomer composite energy absorbing layer is prepared by compounding a high-performance fiber impregnated matrix resin and an elastomer material, the high-performance fiber impregnated matrix resin accounts for 25-35 wt % of the fiber-elastomer composite energy absorbing layer, the elastomer material accounts for 15-20 wt % of the fiber-elastomer composite energy absorbing layer; and a thickness of the fiber-elastomer composite energy absorbing layer is 3.5 mm to 4.5 mm.

4. The multilayered bullet resistant member of claim 3, wherein a high-performance fiber is selected from the group consisting of aramid fibers, ultrahigh molecular weight polyethylene fibers, carbon fibers, poly (p-phenylene-benzobisoxazole) (PBO) fiber filaments and staple fibers; a matrix resin is selected from the group consisting of thermosetting epoxy resin, phenol-formaldehyde resin and organic silicone resin; the elastomer material is selected from the group consisting of shear thickening fluid and polyurethane foam; and a woven form of the high-performance fiber filaments is selected from the group consisting of plain, twill and satin.

5. The multilayered bullet resistant member of claim 1, wherein the two-dimensional fabric blunt trauma protective layer is prepared by compounding a continuous length high-performance fiber impregnated matrix resin, wherein a high-performance fiber is arranged in a length direction of an impregnated fabric; a thickness of the two-dimensional fabric blunt trauma protective layer is 10 mm to 12 mm.

6. The multilayered bullet resistant member of claim 5, wherein the high-performance fiber is arranged in layers by one or more of aramid fibers, ultrahigh molecular weight polyethylene fibers and poly (p-phenylene-benzobisoxazole) (PBO) fibers.

7. The multilayered bullet resistant member of claim 5, wherein a matrix resin is selected from the group consisting of thermosetting epoxy resin, phenol-formaldehyde resin, organic silicone resin and vinyl ester resin; and a content of the matrix resin accounts for 15-25 wt % of the two-dimensional fabric blunt trauma protective layer.

8. A bullet resistant body armor, a bullet resistant wall or a bullet resistant shield comprising the multilayered bullet resistant member of claim 1.

9. The bullet resistant body armor, the bullet resistant wall or the bullet resistant shield of claim 8, wherein the aluminum alloy is at least one selected from the group consisting of 2024 series Al—Cu—Mg, 7000 series Al—Zn, 5000 series Al—Mg and 2000 series Al—Cu.

10. The bullet resistant body armor, the bullet resistant wall or the bullet resistant shield of claim 8, wherein the fiber-elastomer composite energy absorbing layer is prepared by compounding the high-performance fiber impregnated matrix resin and the elastomer material, the high-performance fiber impregnated matrix resin accounts for 25-35 wt % of the fiber-elastomer composite energy absorbing layer, the elastomer material accounts for 15-20 wt % of the fiber-elastomer composite energy absorbing layer; and the thickness of the fiber-elastomer composite energy absorbing layer is 3.5 mm to 4.5 mm.

11. The bullet resistant body armor, the bullet resistant wall or the bullet resistant shield of claim 10, wherein the high-performance fiber is selected from the group consisting of aramid fibers, ultrahigh molecular weight polyethylene fibers, carbon fibers, PBO fiber filaments and staple fibers; the matrix resin is selected from the group consisting of thermosetting epoxy resin, phenol-formaldehyde resin and organic silicone resin; the elastomer material is selected from the group consisting of shear thickening fluid and polyurethane foam; and the woven form of the high-performance fiber filaments is selected from the group consisting of plain, twill and satin.

12. The bullet resistant body armor, the bullet resistant wall or the bullet resistant shield of claim 8, wherein the two-dimensional fabric blunt trauma protective layer is prepared by compounding the continuous length high-performance fiber impregnated matrix resin, wherein a high-performance fiber is arranged in the length direction of the impregnated fabric; the thickness of the two-dimensional fabric blunt trauma protective layer is 10 mm to 12 mm.

13. The bullet resistant body armor, the bullet resistant wall or the bullet resistant shield of claim 12, wherein the high-performance fiber is arranged in layers by one or more of aramid fibers, ultrahigh molecular weight polyethylene fibers and poly (p-phenylene-benzobisoxazole) (PBO) fibers.

14. The bullet resistant body armor, the bullet resistant wall or the bullet resistant shield of claim 12, wherein the matrix resin is selected from the group consisting of thermosetting epoxy resin, phenol-formaldehyde resin, organic silicone resin and vinyl ester resin; and the content of the matrix resin accounts for 15-25 wt % of the two-dimensional fabric blunt trauma protective layer.

15. A method of preparing a multilayered bullet resistant member, comprising the steps of:

1) preparing a metal-ceramic crack arrest reflecting layer: compounding a surface pretreated ceramic material preform by adopting a ceramic preform metal solution infiltration method to obtain the metal-ceramic crack arrest reflecting layer, wherein a content ratio of a metal to a ceramic is 1:1, a preform has a preheating temperature of 300° C.-500° C., a casting temperature of 700° C.-900° C., and a permeation pressure of 2 MPa-5 MPa;

2) preparing a fiber-elastomer composite energy absorbing layer:

combining a high-performance fiber and an elastomer material by adopting an impregnation drying method or a foaming curing process, so as to obtain a fiber-elastomer composite material, and compounding the fiber-elastomer composite material with a matrix resin by adopting a vacuum assisted forming process to obtain the fiber-elastomer composite energy absorbing layer, wherein a curing temperature is 80° C.-150° C.;

3) preparing a two-dimensional fabric blunt trauma protective layer: respectively impregnating one or more high-performance fiber bundles and a high-performance plain woven fabric in the matrix resin, uniformly spreading the one or more high-performance fiber bundles and the high-performance plain woven fabric by using a compression roller, wherein the one or more high-performance fiber bundles are used for preparing a single UD sheet, and a content of the matrix resin is controlled to be 15-20 wt %; laying 20 layers of the single UD sheet in cross-ply at a preset mixing ratio by 0°/90° to obtain a first fabric layer, laying 4 to 6 layers of the high-performance plain woven fabric to obtain a second fabric layer, and bonding the first fabric layer and the second fabric layer together with a compounding machine and a flat plate thermocompressor to obtain the two-dimensional fabric blunt trauma protective layer, and pressing under 10 MPa-20 MPa for 4 h to 5 h at a curing temperature of 80° C. to 150° C.; and 4) bonding and compounding the metal-ceramic crack arrest reflecting layer, the fiber-elastomer composite energy absorbing layer and the two-dimensional fabric blunt trauma protective layer, so as to prepare the multilayered bullet resistant member.

* * * * *